Oct. 20, 1942.  N. S. REYNOLDS  2,299,590
SEAL
Filed Oct. 1, 1941
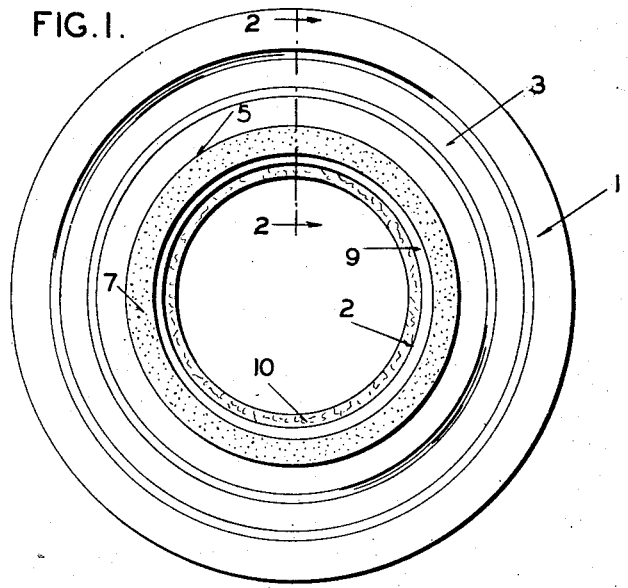
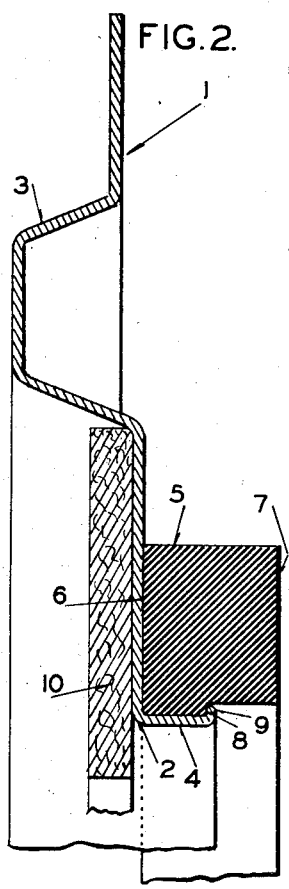
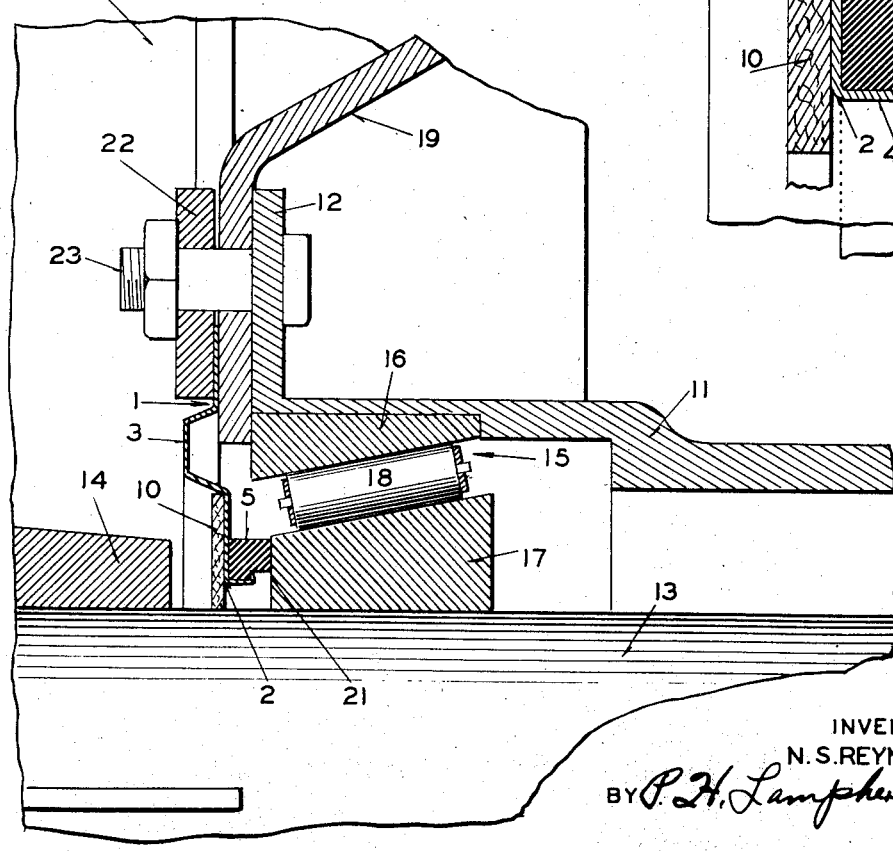
INVENTOR
N. S. REYNOLDS
BY P. H. Lamphere
ATTORNEY Patented Oct. 20, 1942

2,299,590

UNITED STATES PATENT OFFICE 2,299,590

SEAL

Noel S. Reynolds, St. Louis, Mo.

Application October 1, 1941, Serial No. 413,083

2 Claims. (Cl. 286—11)

My invention relates to seals and more particularly to an improved diaphragm seal for use with a rotating shaft and a fixed support.

One of the objects of my invention is to provide improved means for mounting a sealing ring on a diaphragm.

Another object of my invention is to associate with a diaphragm seal a means for causing the seal to be held in proper position during assembly, said means also having the additional function of preventing foreign material from reaching the sealing surfaces.

Other objects of my invention will become apparent from the following description taken in connection with the accompanying drawing in which Figure 1 is an axial view of an improved diaphragm seal embodying my invention; Figure 2 is a sectional view taken on the line 2—2 of Figure 1; and Figure 3 is a sectional view of a portion of a rear axle construction showing the seal in operative position.

Referring to the drawing in detail and particularly Figures 1 and 2, numeral 1 indicates an annular imperforate metal disc or diaphragm having an opening 2 at its center and provided with a concentric strengthening corrugation 3 positioned intermediate the periphery of the disc and the opening. The inner portion of the disc at the opening is provided with a cylindrical flange 4 which extends in an axial direction from the side of the disc opposite that on which the corrugation is positioned. The disc or diaphragm, as described, is all made from a single piece of thin metal which may be brass, bronze, or other alloy. The metal may be from six to eight thousandths of an inch thick and have such resilience as to be capable of a certain degree of flexing without deformation.

The diaphragm adjacent the opening 2 carries a sealing ring 5 of any suitable material, as for example, graphite, Oilite, Bakelite, etc. One end surface 6 of the ring lies adjacent the body of the disc and the other end 7 of the ring is smooth and forms the sealing surface thereof. The ring has such an internal diameter as to snugly fit around the flange 4. A portion of the inner surface of the ring is cut back to provide an annular shoulder 8 the surface of which is at right angles to the axis of the ring. In order that the ring may be firmly secured to the disc, the inner end 9 of the flange is turned over so as to engage the shoulder 8 and thus lock the ring to the disc and to also so clamp the ring to the disc that fluid cannot pass between the ring and disc.

The seal is also provided with a felt washer 10 of such external diameter as to fit within the corrugation 3 on the side opposite the ring and thus obtain some support from said corrugation. The washer is preferably secured to the surface of the disc by an adhesive substance. The internal diameter of the washer is less than the internal diameter of the opening 2 of the disc, thus resulting in the washer projecting radially inwardly beyond the opening and the flange of said disc. The purpose of this washer is to provide means for causing the seal to be held in proper position during assembly and to also prevent any foreign material from reaching the sealing surface 7 as will become apparent from the following description of a use of the seal.

Referring to Figure 3, I have shown my improved seal positioned for use in a vehicle rear axle construction to prevent grease from passing out of the bearing between the rear axle and the housing. The rear axle construction shown comprises an axle housing 11 which is formed with a flange 12 at its outer end. An axle 13 extends through the housing and drives the wheel hub 14 keyed to the axle. A bearing 15 of common construction is provided at the outer end of the housing and the axle and comprises a race 16 pressed in the end of the housing, a race 17 pressed on the axle, and a plurality of rollers 18 cooperating with the races. The flange 12 of the housing carries the usual brake assembly backing plate 19 upon which the brake shoes 20 (one only being shown) are supported for cooperation with the brake drum (not shown) carried by the wheel.

The seal embodying my invention is positioned in this axle construction so as to be mounted on the axle housing with the end surface 7 of the sealing ring cooperating with the end surface 21 of the bearing race 17 which is rotatable with the axle 13 and thus prevent any grease from passing out of the housing 11. The seal, when placed in operative position, has the outer portion of the disc clamped between the backing plate 19 and a ring 22 by means of the bolts 23 which secure the backing plate to the axle housing flange 12. The seal is so proportioned and constructed that when the outer portion of the disc is clamped in position, the flat surface 7 on the end of the sealing ring will be held in pressure engagement with the flat surface 21 on the race 17. This pressure engagement is brought about by having the axial distance between the plane of the clamped portion of the body of the disc and the surface 7 on the ring slightly greater than the axial distance between the surface of the packing plate engaged by the disc and the surface 21 of the bearing race. Thus, when the disc is clamped in position, the outer peripheral portion of the disc and the inner portion of the disc will be flexed axially with respect to each other. Since the metal from which the disc is made is resilient, this flexing of the disc will cause the end surface 7 of the sealing ring to be held tightly against the end surface 21 of the race. The result is an efficient sealing action whereby grease cannot pass out of the bearing, notwithstanding this grease may be quite thin.

The hole through the felt washer 10 has a diameter which is the same as or slightly less than the outer diameter of the axle 13. Thus, when the seal is initially positioned on the axle during assembly and prior to having its periphery clamped to the axle housing (wheel hub removed) the sealing ring will be held concentric with the axle due to the fact that the felt washer projects radially inwardly beyond the opening 2 of the diaphragm. The sealing surface 7 on the ring is thus properly positioned to engage the flat surface 21 on the bearing surface. There is no danger of the seal being so positioned during assembly that any part of the sealing ring or disc will ride on the axle surface and be damaged as a result of play due to worn bearings.

Besides acting as a proper positioning means for the seal during assembly, the felt washer 10 has the additional function when the seal is in operative position of acting as an extra seal to prevent dust and other foreign material from passing to the sealing surfaces 7 and 21 and thereby cause rapid wear of these surfaces and thereby impair the sealing action.

Although I have shown the felt washer 10 so positioned and of such material that it acts as a dust seal and a positioning means, it is possible in accordance with my invention to employ a washer of any suitable material, such as cardboard, and so mounted on the disc that it will act only as a positioning means to aid in assembly.

A seal which has been constructed in accordance with my invention will produce a very efficient sealing action between the axle and the axle housing. The sealing ring is very firmly clamped to the disc by the particular construction shown wherein the end of the flange 4 is turned over and caused to forcibly engage the shoulder 8 on the inner surface of the ring. This method of mounting the ring on the disc insures that the ring will not have any relative movement with respect to the disc and that the ring will be so firmly engaged with the disc surface that grease cannot leak between the disc and the ring. By associating a felt washer with the sealing ring in the manner shown, there is no possibility that the seal will be improperly assembled. Also harmful foreign material will be prevented from reaching the sealing surfaces.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a seal for association with a fixed member and a shaft carrying an annular surface positioned at substantially right angles to the axis of said shaft, said seal comprising a one-piece metallic disc having an oversize opening for receiving the shaft and adapted to be secured to the fixed member, a sealing ring mounted on one side of said disc in surrounding relation to the opening therein and provided with an annular end surface adapted for engagement with the surface on the shaft, and a relatively thin washer having one of its flat surfaces directly adhered to the surface of the disc on the side opposite the ring and being of such internal diameter as to have a portion extending radially inwardly beyond the opening of the disc so as to engage the shaft and properly position the seal during assembly.

2. In a seal for association with a fixed member and a shaft carrying an annular surface positioned at substantially right angles to the axis of said shaft, said seal comprising a disc having an oversize opening for receiving the shaft and adapted to be secured to the fixed member, said disc being provided with an annular ridge on one side thereof and concentric with the opening, a sealing ring mounted on the other side of said disc in surrounding relation to the opening, said ring having an internal diameter greater than the shaft and being provided with an outer end surface for engagement with the surface on the shaft, and a washer positioned adjacent the surface of the disc on the same side as the annular ridge and having a portion extending radially inwardly beyond the opening of the disc so as to engage the shaft and properly position the seal during assembly, the outer diameter of said disc being substantially the same as the inner diameter of the ridge in order that said washer may fit within the ridge and receive support therefrom.

NOEL S. REYNOLDS.